(12) United States Patent
Chandrasekaran et al.

(10) Patent No.: US 11,727,685 B2
(45) Date of Patent: Aug. 15, 2023

(54) SYSTEM AND METHOD FOR GENERATION OF PROCESS GRAPHS FROM MULTI-MEDIA NARRATIVES

(71) Applicant: KPMG LLP, New York, NY (US)

(72) Inventors: Swaminathan Chandrasekaran, Coppell, TX (US); Shiwangi Singh, Chicago, IL (US); Shan-Chuan Li, Edison, NJ (US); Anand Sekhar, Chicago, IL (US); Qianhao Yu, Chicago, IL (US); Sathyanarayan Venkateswaran, Chicago, IL (US); Oliver Michael Baltay, Chicago, IL (US)

(73) Assignee: KPMG LLP, New York, NY (US)

( * ) Notice: Subject to any disclaimer, the term of this patent is extended or adjusted under 35 U.S.C. 154(b) by 431 days.

(21) Appl. No.: 16/942,485

(22) Filed: Jul. 29, 2020

(65) Prior Publication Data

US 2022/0036083 A1    Feb. 3, 2022

(51) Int. Cl.
*G06V 20/40* (2022.01)
*G06F 40/58* (2020.01)
*G06F 16/901* (2019.01)
*G06F 18/24* (2023.01)
*G06N 3/04* (2023.01)

(52) U.S. Cl.
CPC .......... *G06V 20/41* (2022.01); *G06F 16/9024* (2019.01); *G06F 18/24* (2023.01); *G06F 40/58* (2020.01); *G06N 3/04* (2013.01)

(58) Field of Classification Search
CPC ..... G06V 20/41; G06F 16/9024; G06F 40/58; G06K 9/6267
See application file for complete search history.

(56) References Cited

U.S. PATENT DOCUMENTS

| | | | |
|---|---|---|---|
| 10,594,757 B1* | 3/2020 | Shevchenko | G06F 40/35 |
| 2015/0279390 A1* | 10/2015 | Mani | G10L 25/48 |
| | | | 704/235 |
| 2018/0293313 A1* | 10/2018 | Hauptmann | G06F 16/7837 |
| 2019/0392330 A1* | 12/2019 | Martineau | G06N 5/04 |
| 2020/0042602 A1* | 2/2020 | Anderson | G06F 40/56 |
| 2020/0301953 A1* | 9/2020 | Abhyankar | G06F 16/3328 |
| 2020/0349347 A1* | 11/2020 | Morzhakov | G06V 20/52 |
| 2020/0380079 A1* | 12/2020 | Sanders | G06F 30/15 |
| 2021/0286989 A1* | 9/2021 | Zhong | G06F 40/177 |
| 2022/0004366 A1* | 1/2022 | Ghosh | G06F 8/34 |
| 2022/0036083 A1* | 2/2022 | Chandrasekaran | G06V 40/174 |
| 2022/0121904 A1* | 4/2022 | Safnuk | G06N 3/04 |

* cited by examiner

*Primary Examiner* — Kevin Ky
(74) *Attorney, Agent, or Firm* — Nelson Mullins Riley & Scarborough LLP; Anthony A. Laurentano

(57) ABSTRACT

A system for characterizing content relating to a desired outcome is disclosed. The disclosed system can be configured to identify context included in content collected from various content sources, map the identified context into graph nodes and graph edges connecting the graph nodes, identify one or more features of the identified context and adjust at least one of: a graph node and a graph edge based on the identified one or more features, identify a graph incorporating the graph nodes, the graph edges, and at least one of an adjusted graph node and an adjusted graph edge, and provide a recommendation for at least one action for achieving the desired outcome based on the identified graph.

43 Claims, 6 Drawing Sheets

SYSTEM AND METHOD FOR GENERATION OF PROCESS GRAPHS FROM MULTI-MEDIA NARRATIVES

FIELD OF THE INVENTION

The present disclosure generally relates to a computer-implemented method and corresponding system collating and processing narrative information from different multimedia sources, and then generating therefrom one or more process graphs.

BACKGROUND OF THE INVENTION

Retrieving relevant information from a large and varied corpus of narrative data is often a challenging and resource consuming task. As such, conventional business process characterization of this data often relies on domain and subject matter expertise to identify and retrieve relevant information for characterizing a business process. For example, interviews with subject matter experts or individuals having knowledge of a specific subject matter domain (e.g., financial, medical, technical, marketing, distribution, etc.) can be used to gather data and then from the data obtain information on an underlying business process. However, such interviews can be inefficient because, in some cases, experts may not be easily accessible and/or business processes can include other types of undocumented information, such as information obtained via word-of-mouth and/or tribal knowledge.

For example, a subject matter expert in a specific medical field often has extensive knowledge about that specific field. Oftentimes, this knowledge lies solely with the expert and is not collated and distilled for use by other practitioners in the same field. As such, this knowledge may be lost if not captured in some manner including in a digital format. The information from the expert can include, by way of illustrative example, how to best prescribe a selected medication to a patient based on ever changing patient dynamics and needs. The expert, such as a doctor, can diagnose the patient for a selected condition. Based on the condition, the doctor may decide to prescribe an initial medication, to be taken at a particular dosage, and for a selected period of time. The initial medication oftentimes has a cost associated therewith. However, the specific medication prescribed by the doctor may need to change if the patient has insurance that only covers certain types of medication or certain costs associated with the medication. If the patient's insurance does not cover the medication or the patient wishes to select a different lower cost option for the medication, then the doctor, based on this real time information, may decide to prescribe a second different medication. As such, the prescription process associated with the patient can change based on real time data and situation associated with the patient. The doctor being highly experienced at this process knows intuitively what questions to ask and when to ask them, and is also adept at changing the prescription type based on this information. There is thus an inherent process associated with the prescription of the medication by the doctor. A less experienced doctor may not know the correct questions to ask and/or when to ask the questions. As such, the process employed by the expert (e.g., the more experienced doctor) is typically not available to the less experienced doctor without side-by-side training.

A conventional system and method for capturing this information can be employed, such as by conducting an interview with the expert. A drawback of these conventional systems is that certain selected but important narrative information associated with the expert is either not captured or is poorly captured. Further, the conventional system may treat the various types of narrative information captured from the expert in the same way or in a manner that underemphasizes important data or overemphasizes unimportant or less critical data. As such, the precise process followed by the doctor either cannot be replicated or is poorly replicated by the conventional systems.

SUMMARY OF THE INVENTION

The present invention is directed to a content characterization system for collecting, aggregating and then processing narrative information from content generators, including subject matter experts, to extract and determine a process graph or flow. The system can include a series of content generators that generate content or narrative information, which is then collected and aggregated by a content source. The content source forwards the information to an application server for subsequent processing and characterization. The application server processes the narrative information based on the type (e.g., audio, video, electronic, etc.) of information received from the content source. The application server can analyze the data to extract features that can be used to form a preliminary graph structure for characterizing the content of the stored data. Specifically, as detailed below, the application server can analyze the information stored in the database and score or weight each piece of information based on one or more factors, such as emotion, truthfulness, accuracy, posture analysis, weighting and the like. The resulting information from scoring the content can be used to generate a graph having nodes that correspond to actions and/or procedures or steps for carrying out a certain task and/or recommendations for actions in order to derive a desired outcome. The process or business graph can then be reviewed by an assigned reviewer who can make changes as needed.

In one aspect, a system for characterizing content relating to a desired outcome is disclosed. The system can comprise at least one memory operable to store content collected from one or more content generators over a predetermined period of time and at least one processor communicatively coupled to the at least one memory. The processor can be operable to identify context included in the collected content, map the identified context into two or more graph nodes and one or more graph edges connecting the at least two graph nodes, identify one or more features of the identified context and adjust at least one of: a graph node and a graph edge based on the identified one or more features, identify a graph incorporating the two more graph nodes, the one or more graph edges, and at least one of an adjusted graph node and an adjusted graph edge, and provide a recommendation for at least one action for achieving the desired outcome based on the identified graph.

In other examples, the aspects above, or any system, method, apparatus described herein can include one or more of the following features.

The one or more content generators can comprise at least one of audio content and video content obtained from an entity having information on the desired outcome. The processor can be configured to identify the context based on converting the audio content to text. Alternatively or additionally, the processor can be operable to identify the context by performing frame detection on the video content. Further, the processor can be operable to identify the context by translating the collected content to a native language. Additionally or alternatively, the one or more content generators can be selected on a multifactorial basis. For example, in some embodiments, the processor can elect a content generator based on a plurality factors. The plurality of factors can include any suitable factors, for example, the content generators history of providing content, background, experience, education, etc.

The processor can also identify the one or more features by performing at least one of interference analysis, electrodermal emotions weighting, truthfulness analysis and weighting, visual posture analysis and weighting, and influence point detection and weighting. The one or more features can comprise at least one of tone and emotion of the identified context.

Further, the processor can be operable to identify at least one content generator based on one or more characteristics of the at least one content generator. The one or more characteristics of the least one content generator can comprise at least one of previous content history, previous review of generated content, and known qualifications of the at least one content generator.

In some embodiments, the processor can be operable to identify the context based on one-shot learning. Alternatively or additionally, the processor can be operable to collect the content from the one or more content generators. Further, in some embodiments, the processor can collect the content over two or more periods of time.

The present invention is also directed to a system for generating a process flow graph from content data. The system comprises one or more content generators for generating the content data, a content collector for collecting the content data generated by the one or more content generators, a domain specific knowledge unit for providing domain specific content data, and a content data pre-processing subsystem having a storage element for storing the content data and a processor for processing the content data and the domain specific content data based on the type of content data to generate processed content data and charactering the processed content data to generate an initial process graph having a plurality of nodes and a plurality of edges. The system further comprises a database for storing the content data from the one or more content generators and the processed content data from the content data pre-processing subsystem, and a processing and weighting subsystem for processing the initial process graph and weighting each of the plurality of nodes relative to each other to generate a final process graph.

The content data preprocessing subsystem includes one or more processors for converting the audio data to text data, extract audio from videos, detecting frames in the video data, decomposing the text data into selected components using a natural language processing technique, identifying one or more selected components of the text data and then classifying the text data into at least one of a plurality of classifications using a classification technique, and extracting nodes and edges from the content data and then generating the initial process graph therefrom. The selected components of the text data comprise one or more of paragraphs, sentences and phrases.

The system of the invention further comprises a translation unit for translating the text data from one language to another language, and the system is operable to identify at least one of the one or more content generators based on one or more characteristics of the one or more content generators. Further, one or more characteristics of the at least one content generator comprises at least one of previous content history data, previous review of generated content data, and known qualifications of the at least one content generator. According to one practice, the one or more content generators comprise one or more of an entity, a subject matter expert, and data associated with a biometric wearable device. Also, the content data can include audio data, video data, biometric data, physiological data, context data and electronic data.

According to the present invention, the classification technique includes one or more of a recurrent neural network (RNN) technique, bidirectional encoder technique, and long-short term memory (LSTM) technique. The domain specific information of the domain knowledge unit includes one or more of domain specific entities, domain specific terms, domain specific actions, and domain specific glossary entries.

The processing and weighting subsystem of the present invention includes a video posture analysis subsystem for processing biometric data associated with the content data, where the biometric data includes facial expression data of the content generator and posture data of the content generator. The video posture analysis subsystem can include a facial analysis unit for analyzing the facial expression data and identifying selected emotions associated with the facial expression data, and a body language analysis unit for analyzing the posture data to identify selected types of body language therein. The facial expression data and the posture data can be used by the processing and weighting subsystem to determine the nodes in the final process graph.

The processing and weighting subsystem further comprises an emotion detection subsystem for analyzing the content data to identify and determine the emotion data associated with the content data, where the content data includes audio data. The emotion detection subsystem includes an electrodermal tonal information unit for detecting tonal information in the content data associated with one or more of the content generators, and a speech emotion recognition unit for detecting emotion in the audio data. The tonal information includes one or more of confidence, emphasis, calmness, happiness, anger, sadness, fearful, disgust, and surprise associated with the content generator.

The processing and weighting subsystem also includes a language analysis subsystem for analyzing the audio data portion of the content data, where the language analysis subsystem includes a common-sense task inference analysis unit for generating task data from the content data, and a truthfulness analysis and weighting unit for performing feature analysis on the content data. The processing and weighting subsystem can also include a graph edge-node generation unit for generating the final process graph from the initial process graph and then refining the graph nodes and edges of the initial process graph based on the data from one or more of the video posture analysis subsystem, the emotion detection subsystem, and the language analysis subsystem.

According to the present invention, the system can include a multi-factorial context weighting unit for weighting the nodes and edges of the final process graph based on one or more types of addition context data, an influence point detection unit for further weighting the nodes and edges of the final process graph by detecting one or more points of influence in the content data, and a one-shot learning unit for classifying and weighing data associated with the graph nodes.

The present invention is also directed to a computer implemented method for generating a process flow graph from content data, comprising providing one or more content generators for generating the content data, collecting the content data generated by the one or more content generators with a content collector, providing domain specific content data via a domain specific knowledge unit, and processing the content data and the domain specific content data with a content data pre-preprocessing subsystem based on the type of content data to generate processed content data and charactering the processed content data to generate an initial process graph having a plurality of nodes and a plurality of edges. The method also includes storing the content data from the one or more content generators and the processed content data from the content data pre-processing subsystem, and processing the initial process graph and weighting each of the plurality of nodes relative to each other to generate a final process graph with a processing and weighting subsystem.

The method of the present invention also with the content data preprocessing subsystem converting the audio data to text data, detecting frames in the video data, decomposing the text data into selected components using a natural language processing technique, identifying one or more selected components of the text data and then classifying the text data into at least one of a plurality of classifications using a classification technique, and extracting nodes and edges from the content data and then generating the initial process graph therefrom. The method of the invention also identifies at least one of the one or more content generators based on one or more characteristics of the one or more content generators. The characteristics of the content generator can include at least one of previous content history data, previous review of generated content data, and known qualifications of the at least one content generator. The classification technique includes one or more of a recurrent neural network (RNN) technique, bidirectional encoder technique, and long-short term memory (LSTM) technique.

The method of the present invention includes a video posture analysis subsystem for processing biometric data associated with the content data, where the biometric data includes facial expression data of the content generator and posture data of the content generator. The video posture analysis can be configured for analyzing the facial expression data and identifying selected emotions associated with the facial expression data with a facial analysis unit, and analyzing the posture data to identify selected types of body language therein with a body language analysis unit. The facial expression data and the posture data can be used by the processing and weighting subsystem to determine the nodes in the final process graph.

The method can further include an emotion detection subsystem for analyzing the content data to identify and determine the emotion data associated with the content data, where the content data includes audio data. The emotion detection subsystem is configured for detecting tonal information in the content data associated with one or more of the content generators with an electrodermal tonal information unit, and detecting emotion in the audio data with a speech emotion recognition unit.

The processing and weighting subsystem of the present invention can further include a language analysis subsystem for analyzing the audio data portion of the content data, for generating task data from the content data with a commonsense task inference analysis unit, and performing feature analysis on the content data with a truthfulness analysis and weighting unit. Further, the processing and weighting subsystem is configured for generating the final process graph from the initial process graph and then refining the graph nodes and edges of the initial process graph based on the data from one or more of the video posture analysis subsystem, the emotion detection subsystem, and the language analysis subsystem.

The method of the present invention includes weighting the nodes and edges of the final process graph based on one or more types of addition context data, further weighting the nodes and edges of the final process graph by detecting one or more points of influence in the content data, and classifying and weighing data associated with the graph nodes.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
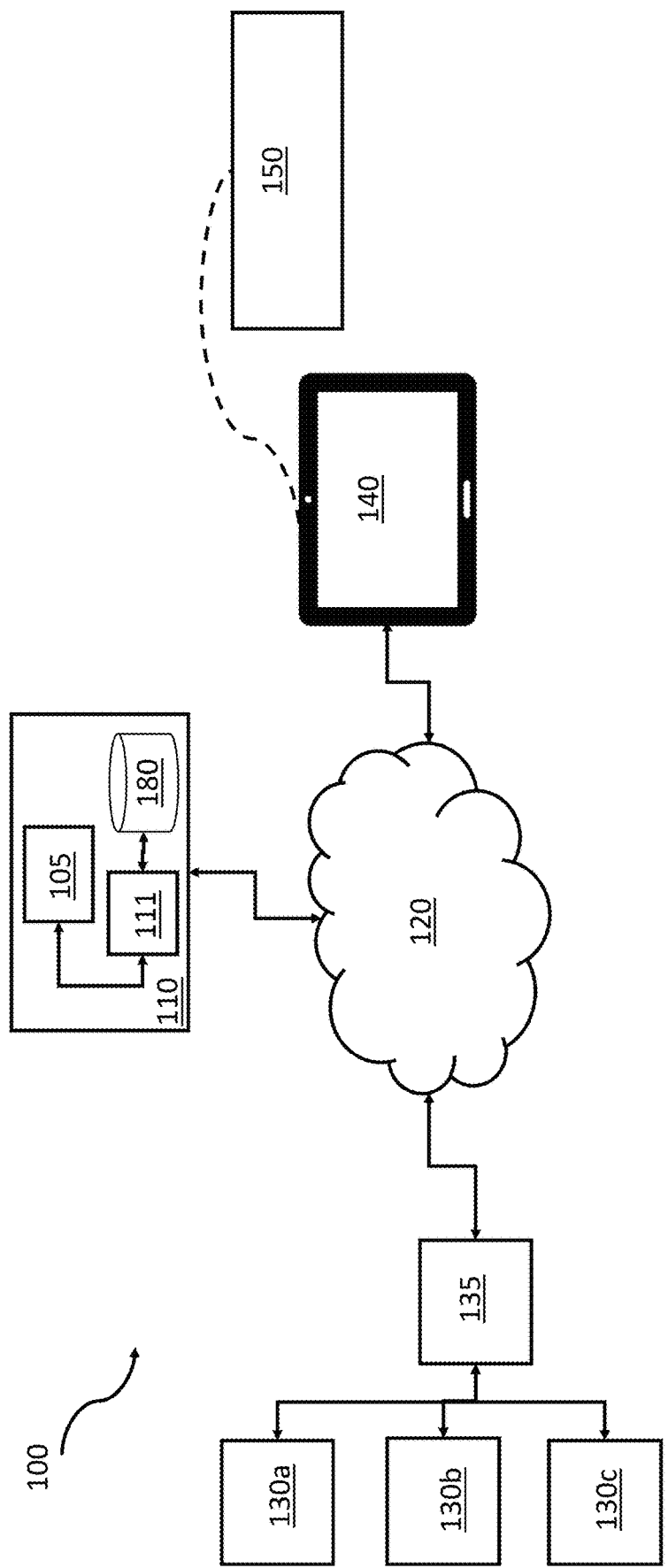
FIG. 1 is a high-level block diagram of a content characterization system according to some embodiments disclosed herein.

FIG. 1 is a high-level block diagram of a content characterization system 100 according to some embodiments disclosed herein. The content characterization system 100 can include an application server 110 that connects to a source of content or narrative data 135 (hereinafter "content source"). The content source 135 can receive its content from one or more content generating sources 130a, 130b, 130c (hereinafter "content generator"). The content generators 130a, 130b, 130c can be any source of information, content or narrative data associated with a subject matter expert. For example, the content generators 130a, 130b, 130c can comprise one or more subject matter experts that provide the narrative data or content data. As used herein, the term "content data" or "narrative data" is intended to include video data, audio data, biological or biometric data, physiological data, context information and the like. For example, the system 100 can record or capture information (e.g., in the form of multimedia recording, for example, in text, image(s), audio, or video), employ one or more devices capable of receiving and/or capturing physiological information (e.g., wearables), one of more context information sources (e.g., metadata, date and time of capture information, any description of meaning and/or purpose of the content, information on creator(s) of the content, information on owner(s) of the content, and/or information on the rating of the content), and/or any other source of information available in the art. Further, additional metadata can be inferred using available techniques to predict qualifications of a content source. For example, information on subject matter experts, such as authorship profiling (e.g., educational qualifications of a subject matter expert) can be considered as a factor for assigning a credibility weight to a source of content. As detailed below, this credibility weight can in turn be used to assign weights to nodes and edges of a graph that characterizes the content being analyzed.

The content source 135 can be configured to collect and aggregate the narrative or content data provided and/or captured by the content generators 130a, 130b, 130c and forward the aggregated information to the application server 110 for processing and characterization. The connection between the application server 110 and the content source 135 can be a direct connection and/or a connection established via any suitable communications network 120.

The communications network 120 can generally be any suitable communications network such as a public network (e.g., the Internet), a private network (e.g., local area network (LAN)), a wide area network (WAN), or a metropolitan area network (MAN). Alternatively or additionally, the communications network 120 can be a hybrid communications network that includes all or parts of other networks. The communications network 120 can comprise any suitable topology known in the art (e.g., star, bus, or ring network topologies).

The application server 110 receives the narrative or content data aggregated by the content source 135 and processes the content data to characterize the content included in the aggregated information. As detailed below, the application server 110 can process the content data based on the type of information received from the content source 135. For example, the application server 110 can perform speech to text recognition on any content that includes audio (e.g., recorded audio content, recorded video content with audio, etc.) and if required perform translation of the data (e.g., translate text extracted from audio in Chinese to text in English). The application server 110 can process other types of narrative or content data as well. In some embodiments, the application server 110 can be configured to access the content source 135 on a periodic basis and retrieve and process the narrative data and content captured by the source over a predetermined amount of time.

The application server 110 can comprise one or more databases 180 that are configured to store the content data received from the content source 135. The database(s) 180 can store the information in any suitable form, for example as raw information (e.g., actual content, such as actual recorded audio before processing), processed information (e.g., text extracted from captured audio), and/or hybrid information (e.g., combination of raw and processed data).

The application server 110 can analyze the data stored in the database(s) to extract features that can be used to form a preliminary graph structure for characterizing the content of the stored data. Specifically, as detailed below, the application server 110 can analyze the information stored in the database and score or weight each piece of information based on factors such as emotion, truthfulness, accuracy, and posture analysis and weighting and the like. The resulting information from scoring the content can be used to generate a graph having nodes that correspond to actions and/or procedures or steps for carrying out a certain task and/or recommendations for actions in order to derive a desired outcome.

The application server 110 can present the characterized content 150 to a user or entity that can use or take advantage of the characterized content 150. The characterized content 150 can be presented to the user using one or more user devices 140 that connect to the application server 110 via the communications network 120. The user device can include, for example, a display element. Generally, the application server 110, the user device 140, and the content sources 130a, 130b, 130c can connect to the communications network 120 via any suitable means of communications available in the art. For example, the application software 110, the user device 140, and the content sources 130a, 130b, 130c can connect to the communications network 120 via a number of links, which can be wired or wireless links.

Figure 2A:
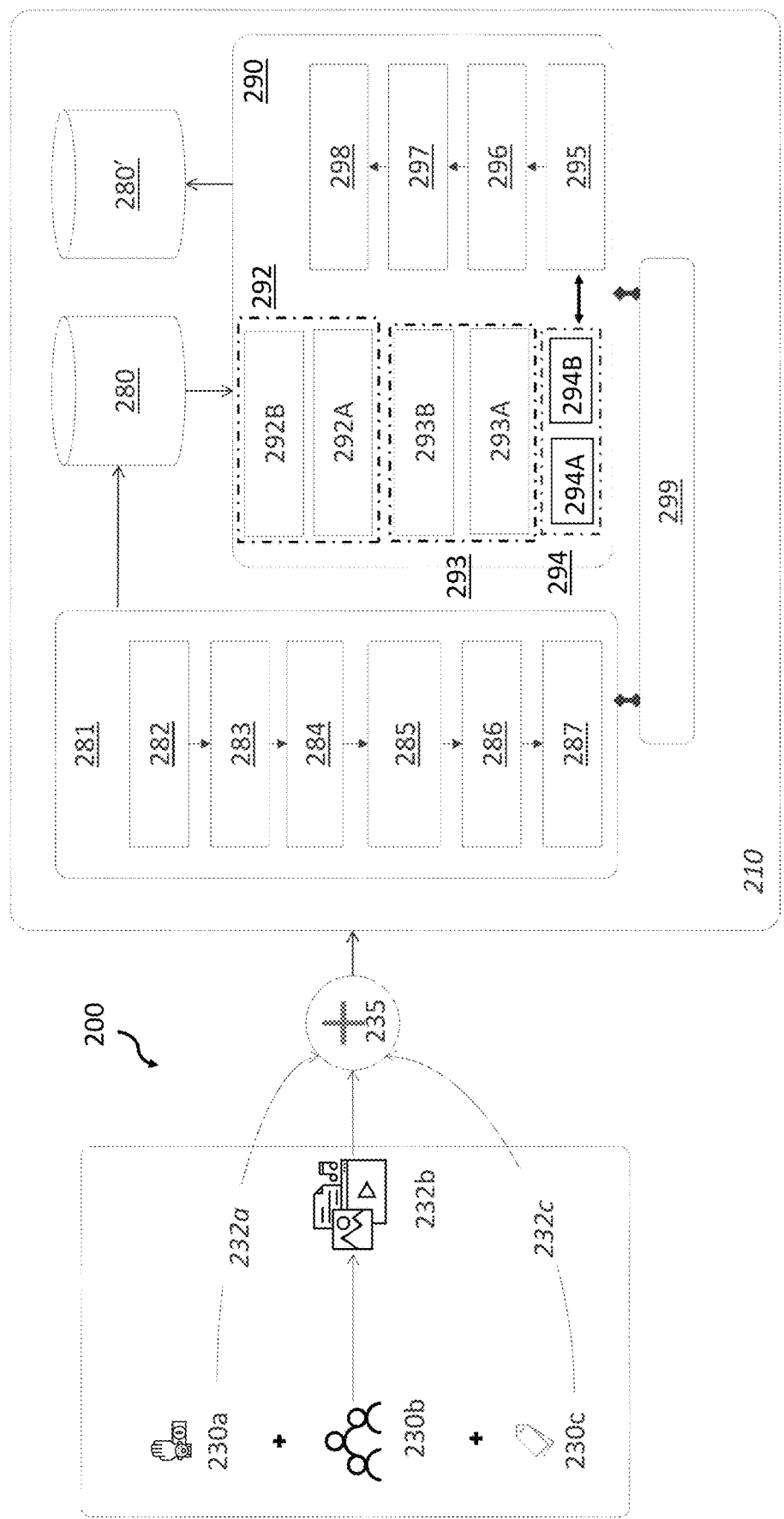
FIG. 2A is an example block diagram of a system for content characterization according to some embodiments disclosed herein.
Figure 2B:
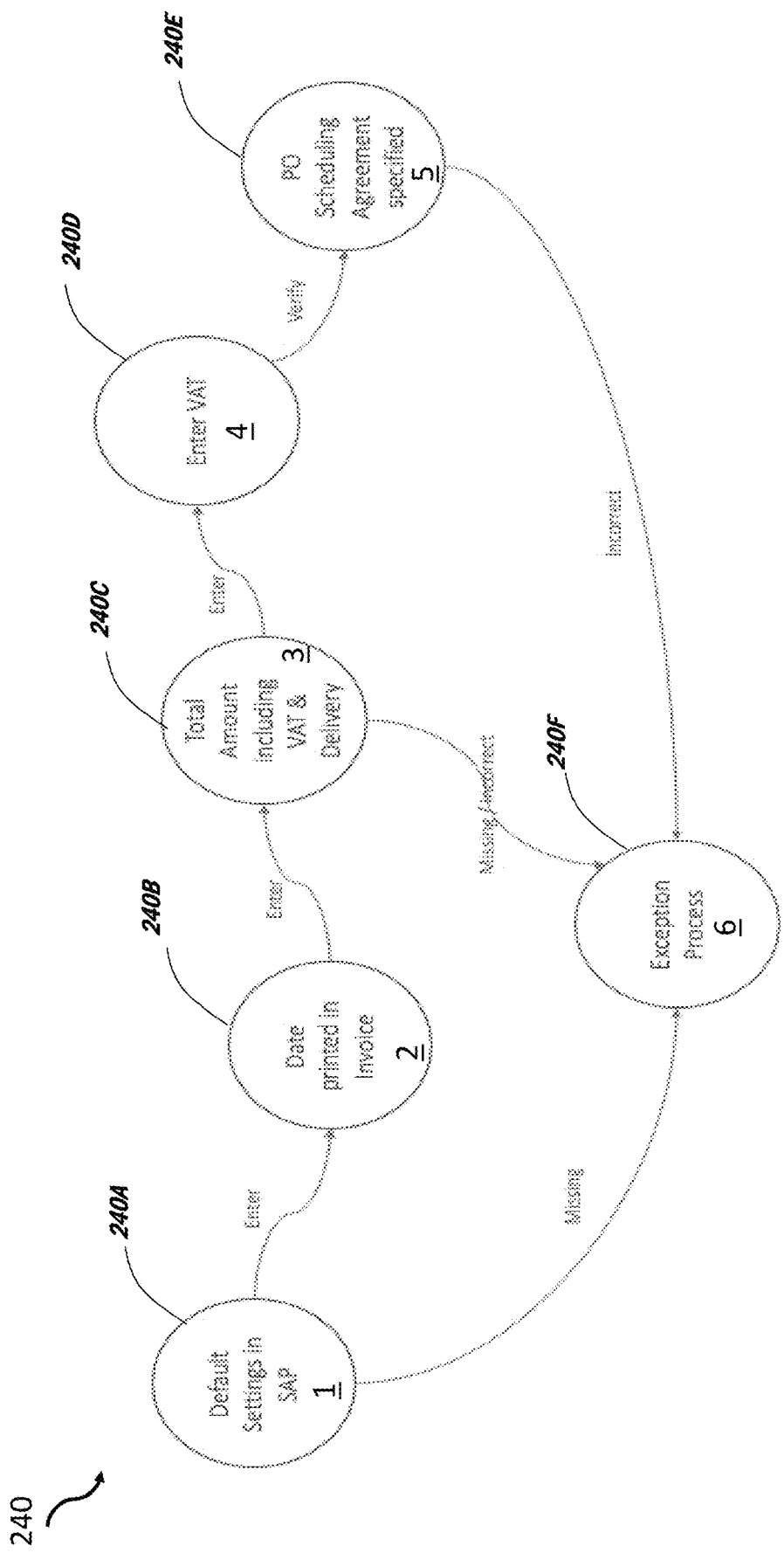
FIG. 2B is an example of a graph according to some embodiments disclosed herein.

By way of illustrative example, and with reference to FIGS. 1-2B, the content generator 130a can be a subject matter expert (e.g., a pastry chef) who is explaining, in real-time, how to perform a specific task (e.g., bake a cake). The subject matter expert can describe the steps for performing the task at hand (e.g., baking a cake) while speaking about various other topics (e.g., the weather). The content or narrative data generated by the subject matter expert 130a can be recorded (e.g., in audio or video form) and forwarded to the content source 135. The content source 135 can also receive additional information from other content generators 130b, 130c (e.g., recipe websites with recipes for the cake and blogs discussing baking the cake). The content source 135 can aggregate this information and forward the information to the application server 110 for subsequent processing. Those of ordinary skill in the art will readily understand that any selected number and types of content generators can be employed by the system 100.

In some embodiments, the one or more content generators can be selected on a multifactorial basis. For example, in some embodiments, the processor 111 of the application server 110 can elect a content generator based on a plurality factors. The plurality of factors can include any suitable factors, including for example, the content generators history of providing content, relevant background, experience level, education level, and the like. For example, reviews provided by other users who may have tried the recipe can be considered in determining whether a recipe website should qualify as a content generator.

The application server 110 can include at least one memory 105 configured to store the information received from the content source 135 in one or more databases 180. A processor 111 can be coupled to the memory 105 and database 180 and be operable to process the information received from the content source 135. For example, the processor 111 can process a video captured from a subject matter expert 130a (e.g., baking video from the chef) and transcribe the audio information in the video from speech to text. The processor 111 can further perform other functions, such as video frame detection, to analyze and understand the retrieved content (e.g., translation of text from a French recipe site to English). The processor 111 can further analyze the aggregated data and score the content included in the data based on factors such as domain specific knowledge, emotions, and tone (e.g., assign higher scores to the portions of the content discussing baking a cake and assign lower scores to portions of the content discussing context unrelated to baking a cake). The scores assigned to various component of data and the data points are mapped into nodes and edges on a graph. The processor 110 can use the nodes on the graph to determine the specific procedures for carrying out the task at hand (e.g., extracts the steps for baking the cake).

Specifically, scores can be assigned based on first detecting and classifying the sentences and phrases in a narrative that are recommendations and/or prescriptive actions. For example, the processor 110 can employ techniques such as named entity recognition for extracting key entities (e.g., device, procedure, subject matter expert role, drug, promotion, etc.) and detecting assertive terms that appear alongside named entities and associated actions (e.g., "highly recommend you back-up your phone before installing the new screen"). The processor 110 can also employ domain specific knowledge to supplement the extracted information with industry or domain specific entities, terms, actions, and other specific glossary entries. Further, assertive phrases/terms along and other procedures performed (e.g., emotion, posture analysis, electrodermal analysis etc.) can also be employed to assign a score to various pieces of the content. The processor 110 can subsequently use the named entities as nodes of the graph and also use the extracted actions as edges of the graph.

These specific procedures/steps 150 for carrying out the task at hand can be forwarded to a user (e.g., a person interested in baking the cake) via a communications network 120. For example, the specific procedures 150 can be displayed on a display screen of a user device 140 for the user's use in carrying out the specific task 150.

FIG. 2A is an example block diagram of a system 200 for content characterization according to some embodiments disclosed herein. As shown in FIG. 2A, the system 200 can comprise a plurality of content generators 230a, 230b, 230c. The content generators 230a, 230b, 230c can be any suitable content generator available in the art. For example, the content generators can comprise one or more wearable devices or wearables 230a (e.g., a wearable capable of collecting health content 232a related to the wearer's pulse, heart rate, sleep, etc.), one or more subject matter experts 230b (e.g., wearer, physicians, financial people, pharmacists, care providers, etc. providing content 232b regarding the wearer), and various other sources of information 230c (e.g., recent heath history, test results, etc. of the wearer 232c). The data obtained from the content generators 230a, 230b, 230c can be generated and collected in any suitable format. For example, the data can be generated in the form of electrical signals, computer-readable files, etc. In some embodiments, the content generated by a content generator 230b can be recorded as images, audio files, and/or video files 232b.

The content 232a, 232b, 232c generated by the content generators 230a, 230b, 230c can be forwarded to a content source 235. The content source 235 collects and aggregates the content received from the content generators and forwards the collected content to the application server 210 for characterization.

The aggregation can be done at the content level, for example at the content production and cataloguing stage. For example, content including a recording of an interview with a subject matter expert having attached electrodermal nodes can be analyzed by reviewing the video and incorporating, at appropriate segments in the video, information obtained from the electrodermal nodes as metadata tags. Other metadata and context information can also be added at an overall content level to enhance the information.

The application server 210 is generally responsible for analyzing and characterizing the content forwarded by the content source 235. It should be noted that although aggregation of content is shown and described as being performed remote from the application server 210, aggregation and collection of content generated by the content generators 230a, 230b, 230c can occur in the application server 210. Further, in some embodiments, the application server 210 can be configured to directly analyze and characterize the content received from the content generators 230a, 230b, 230c, without requiring aggregation of the content 232a, 232b, 232c.

As noted, the application server 210 can analyze the received content 232a, 232b, 232c by performing various ingestion and enrichment operations. As such, the system 200 can include a content data pre-processing subsystem 281 for processing the content data from the content source 235. Specifically, the application server 210 can include one or more processors that implement the content data pre-processing subsystem 281 for performing various ingestion and enrichment operations carried out by the application server 210 so as to provide structure to the data. For example, the application server can perform speech to text transcriptions 282 on audio and video content that is received from the subject matter experts. Additionally or alternatively, the application server can perform a series of other operations. For example, the content data pre-processing subsystem 281 can include an automated machine translator 283 for detecting a non-native language and then converting the speech into a native language. The content data pre-processing subsystem 281 can also include a video frame detection unit 284 for receiving and analyzing video content from the subject matter experts and then identifying selected video frames of the video content. The content data pre-processing subsystem 281 can also include transcript summarization and decomposition unit 285 for obtaining a transcript of an interview with the subject matter expert as input and breaking the input into appropriate paragraphs, sentences, and phrases, and identifying whether any of the paragraphs, sentences, and phrases include a reference to an instruction or recommendation mentioned by the subject matter expert. Transcript summarization and decomposition can be done using any suitable technique, for example by applying one or more natural language processing (NLP) techniques including structure extraction, sentence boundary detection, tokenization, acronym normalization, classification, named entity extraction, phrase extraction, etc.

The content data pre-processing subsystem 281 can also include a classification unit 286 that applies one or more classification techniques to the content data received from the content generators 230a, 230b, 230c. For example, the received content data can contain instructions such as: "before installing the update on your smart phone, it is recommended that you have a backup of your data" or "before approving the invoice, check the invoice date, number of items are less than $100, and/or items that are less than USD $1000." The application program can identify and classify such pieces of content as instructions and classify these content pieces accordingly. Generally, any suitable and known text classification technique can be used. For example, in some embodiments, at least one of recurrent neural networks (RNN), bidirectional encoders, and long short-term memory (LSTM) can be used to identify and classify content.

These procedures can provide an enriched repository of raw multimedia data and then the content data pre-processing subsystem 281 can include a domain node and edge extraction unit 287 for extracting features from the raw data and then generating a preliminary or initial graph structure that includes a plurality of nodes and edges. The processor of the application server 210 can augment these features with a domain specific knowledge unit 299, that is created and updated through repeated analysis of subject matter interviews and/or with other types of information associated with the specific domains of the data associated with the subject matter expert. For example, the data can be finance specific data, medical specific data, and the like. Such domain specific knowledge can supplement the system with industry or domain specific entities, terms, actions, and other specific glossary entries. For example, in the medical domain, an enriched repository can contain information such as information on key entities including drugs, diseases, and symptoms, information on key phrases that are indicative of medical procedures to be performed, and information on typical sentences that are indicative of instructions. Such information can be used to train the different models described herein.

For example, the application server 210 can supplement the content received from the content generators with already available content, such as content previously received from one or more content generators (e.g., information regarding medications typically taken by individuals having similar health issues as the wearer of a wearable content generator 230*a*). The domain node and edge extraction unit 287 based on the foregoing data and operations can start to identify the major steps in the business process via the nodes. That is, the instruction classification unit 286 can classify the given contextual domain, and the domain node and edge extraction unit 287 can cluster and group the extracted nodes, edges and agents to begin forming the initial graph structure.

The content analyzed and processed by the content data pre-processing subsystem 281 can be stored in an enriched multimedia repository database 280 for use in subsequent analysis and processing and also to perform any suitable analysis, such as facial expression analysis, truthfulness analysis, electrodermal emotion weighting, etc., in order to score the nodes and edges.

The multimedia repository database 280 can be a database that stores the content 232*a*, 232*b*, 232*c* received from the content generators 230*a*, 230*b*, 230*c*. Additionally or alternatively, the multimedia repository 280 can also store the content analyzed by the ingestion and enrichment operations 281, such as text transcriptions 282 of the generated content, possible translations of the content 283, analyzed video frames 284 of the content, instruction classification 286 of the content, the domain node and edge extraction 287, and the like.

The one or more processors of the application server 210 can also implement various other analysis and processing techniques to the content data and/or the initial process graph structure. To that end, the system 200 can further include a processing and weighting subsystem 290 for performing or applying further processing techniques to the content data or the initial graph structure. The processing and weighting subsystem 290 can include a video posture analysis subsystem 294 for further processing of the content data, and specifically of the biometric portions of the content data, using suitable facial expression and/or posture analysis techniques. The video posture analysis subsystem 294, according to one practice, can include a facial analysis unit 294A that can employ known facial recognition techniques to identify selected emotions (e.g., happy, sad, angry, surprise, fear, calm, etc.) of one or more of the content generators 230*b* (e.g., the subject matter expert or entity) as well as a body language analysis unit 294B that employs known techniques to determine or identify selected types of body language (e.g., nervous, excited, calm, etc.). The processing and weighting subsystem 290 can also include an emotion detection subsystem 293 for detecting and identifying emotion data from the content data. The emotion detection subsystem 293 can include for example an electrodermal tonal information unit 293A that can be employed to detect tonal information or emotional changes (e.g., confidence, happiness, fearful, disgust, anger, surprise, doubtful, and the like.) from electrodermal data associated with one or more of the content generators. The electrodermal data can be generated by known detection and measurement devices (e.g., heart rate sensors, skin conductance detectors, galvanic skin detectors, and the like) that can be connected to the subject matter expert, such as known wearable devices. The emotion detection subsystem can also include a speech emotion recognition (SER) unit 293B for detecting features and hence emotions in the audio data portion of the content data associated with the subject matter expert. The speech emotion recognition unit can employ known speech recognition techniques, including for example a convolutional neural network and a recurrent neural network (RNN) classifier can be used first to classify the emotional data. The processing and weighting subsystem 290 can further include a language analysis subsystem 292 for analyzing the audio data portion of the content data. The language analysis subsystem can include a commonsense task inference analysis unit 292A that is configured to infer task data, such as events, intentions or reactions, from the content data, and specifically the audio data and/or the text data, by employing known corpus data, such as Google Syntactic N-grams, and known natural language processing (NLP) techniques. The truthfulness analysis and weighting unit 293 can be performed by employing syntactic and semantic feature analysis of the content data from the content data pre-processing subsystem 281 and by using known machine learning techniques. The language analysis subsystem 293 can generate truthfulness scores that can be used to weight the content data when the system 200 is generating the final process graph. The extracted context can then be used by the one or more processors of the application server 210 in determining the context of the received content and characterizing the received content (e.g., in the cake baking example, the context and tone analysis can distinguish between cake baking instructions and other conversation and chatter, such as conversation regarding the weather). At this point, the transcript or text data along with the context data is segmented, key instructions are classified, and entities and nodes are extracted. Therefore, as detailed above, information such as representative sentences and training data can be used to train a text classification model (e.g., using at least one of recurrent neural networks (RNN), bidirectional encoders, and long short-term memory (LSTM) techniques) to identify instructions included.

The one or more processors can further generate a graph that characterizes the content received from the content generators 230*a*, 230*b*, 230*c*. The application server 210 and specifically the processing and weighting subsystem 290 can further include a graph edge-node generation unit 295 for further generating and refining the graph nodes and edges of a initial process graph based on the data from one or more of the video posture analysis subsystem 294, the emotion detection subsystem 293, and the language analysis subsystem 292. The graph can include a plurality of nodes and each node can be connected to at least one other node by an edge of the graph. FIG. 2B is an example of a final process graph 240 generated by the graph edge-node generation unit 295 according to some embodiments disclosed herein. Specifically, the example process graph 240 shown in FIG. 2B illustrates how a subject matter expert recorded on the topic of how to verify an invoice can be used in the process of verifying an invoice. As shown, the transcript from the video recording can indicate the following procedures for invoice verification:

Step 1: Before verifying invoices, check that your default settings in SAP are correct.

Step 2: Enter the date printed on the invoice document.

Step 3: Enter the invoice number from the invoice document in the same format as it is on the document. As this is a required field, if you do not have an invoice number, enter something meaningful to refer to the invoice. For example, enter the total amount from the invoice this includes any delivery and VAT. This is sometimes called Gross Amount or Invoice Total.

Step 4: Enter the VAT amount from the invoice.

Step 5: Ensure that purchase order and/or scheduling agreement has been specified.

As shown, the graph 240 can include a plurality of nodes 240A-240E that correspond to a series of tasks or steps that correspond to Steps 1-5 set forth above. The nodes are connected to edges or connections that can have attribute data associated therewith. The graph 240 can also include node 240F that corresponds to an exception process or step (step 6) that allows the process to proceed to the exception process at various stages (e.g., steps 1, 3, and 5). The exception process can indicate what actions should be taken in an event an exception to the described processes is encountered (e.g., in an event a date is not included on the invoice). The exception process can be derived and represented as a graph from the narrative content, provided that rules for addressing the exception are discussed in detail. In the event rules for addressing the exception are not described in details, the system can accesses other sources of information for addressing the exception issue and/or allow intake of information obtained at a later time (e.g., from an alternate source) for addressing the exception issue.

As shown with reference to FIG. 2B, the characterized context (e.g., various steps that a patient should follow in taking her medication, various procedures for baking a cake, etc.) is mapped to the nodes 240A-240F of the graph 240 such that each node 240 corresponds to a specific step and/or procedure for carrying out a task or process in the received content. The edges can comprise information relating to various actions for carrying out the task or process in the received content. The graph edges and nodes can also undergo selected weighting by a multi-factorial context weighting unit 296 for weighting the selected nodes 240A-240F relative to each other and one-shot learning and one-shot based weighting of the graph nodes employing the one-shot learning unit 298.

The multi-factorial context weighting unit 296 can consider any additional suitable context factors. For example, these factors can include subject matter expert attributes (e.g., education level, years of experience, years in current role, number of engagements completed, review rating, etc.), video narrative context (e.g., date, time, duration, etc.), and content views (e.g., number of likes, views, dislikes, comments, etc.). The attributes can be employed by the context weighting unit 296 to assign a confidence score or weight to one or more, or all, of the nodes in the process graph. The weighting assigned to the nodes can be further modified or adjusted by the influence point and detection and weighting unit 297 by identifying one or more influence points in the content data and then assigning a weight to the influence points. The weight assigned to the influence point is greater than the weight assigned to points not deemed to be of influence. The points of influence can correspond to one or more nodes or edges on the final graph or can correspond to data not yet defined as a node or edge. As noted, one-shot learning from the one-shot learning unit 298 can then be applied. For example, during one-shot learning, the system 200 can learn from very small and/or sparse amount of training examples and assign a weight to the nodes and edges (e.g., based on applying Bayesian framework and/or 1-nearest neighbor techniques) based on this learning to be able to properly classify a sentence as an instruction, distinguish the instructions from chatters, and/or extract an entity from the sentence.

Specifically, the processor can determine a score for the influence of edges and nodes by leveraging several techniques including emotion, truthfulness, accuracy, and posture analysis and weighting, as well as a one-shot based learning model, to determine the most relevant set of nodes and edges for inference based on the "influence" scores. Further, the processor can adjust the values or weights of the nodes and edges by applying the weight of the influence scores and arrive at an adjusted graph. For example, training data having many records or instances can be considered influential when deletion from the training data can considerably change predictions of the model. Generally, the more the model predictions change when the model is retrained with a particular instance removed from the training data, the more influential that instance is. In some embodiments, determining whether the training data can be considered influential by obfuscating or redacting or swapping words in a sentence to determine how that can affect the nodes from a classification and extraction perspective.

The nodes and edges can be stored in a database 280' of the application server 210. For example, the identified nodes and edges of the final process graph can be stored in the database. Additionally or alternatively, the application server 210 can forward the characterized content for display on a display screen of a device belonging to a user of the content characterization system. Specifically, the predicted influence scores of highly relevant nodes and edges can be utilized to produce tailored recommendations for actions in order to derive a desired outcome. For example, the system can predict that a manufacturer should increase the production for a certain product in order to meet a high demand for that product. Further, the final processing graph can be subjected to a post-processing review and/or analysis by a suitable electronic device or by a designated reviewer. The electronic device or the reviewer can review the final process graph and can revise or adjust the process graph as deemed appropriate.

Figure 3:
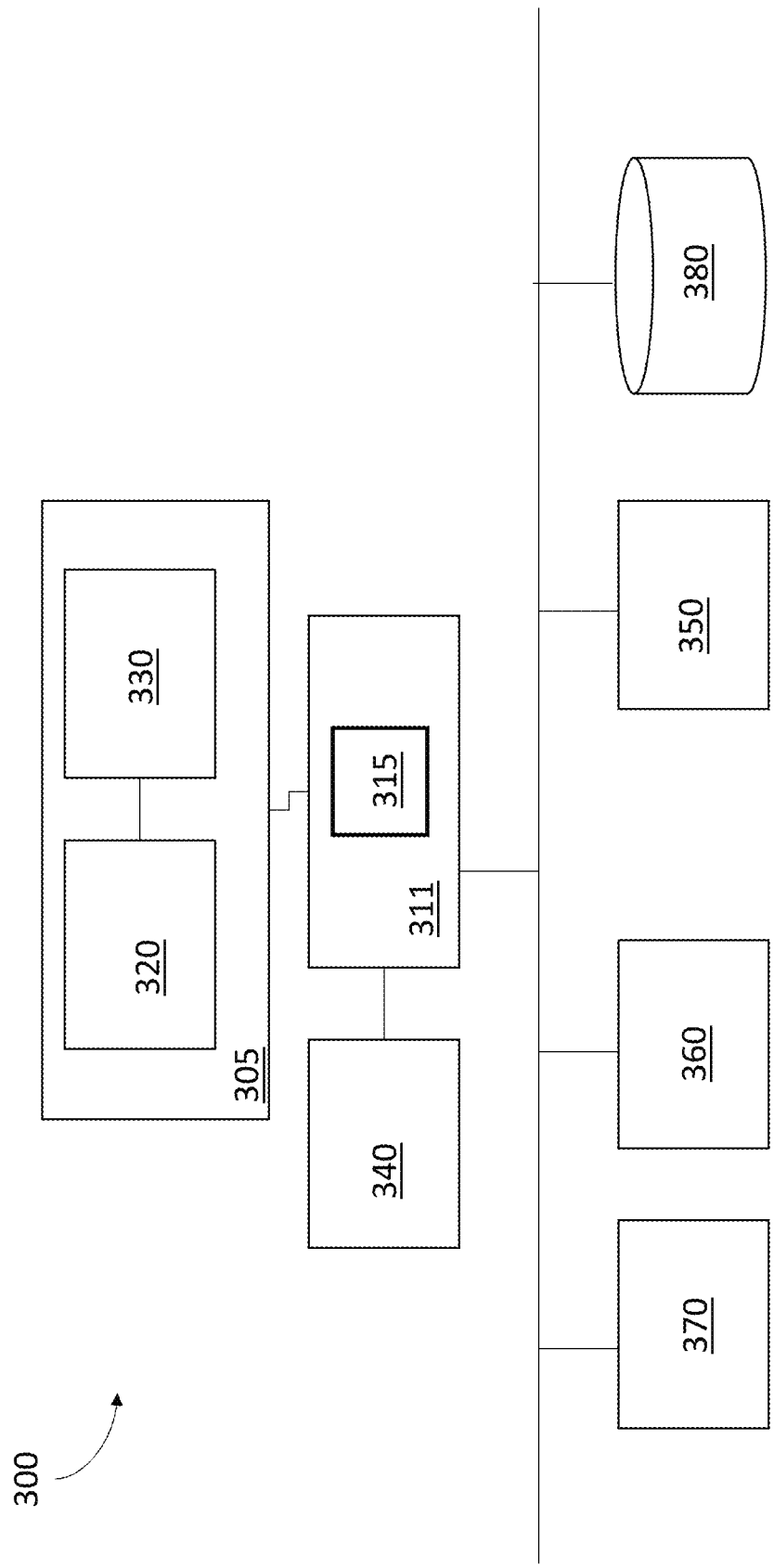
FIG. 3 is a high-level block diagram of digital/electronic processing circuitry or computer hardware that can be used with the embodiments disclosed herein.

FIG. 3 is a high-level block diagram of digital/electronic processing circuitry 300 or computer hardware that can be used with the embodiments disclosed herein. Without limitation, the techniques described herein can be implemented in digital electronic circuitry or in computer hardware that executes firmware, software, or combinations thereof, for example. The implementation can be as a computer program product (e.g., a computer program tangibly embodied in a machine-readable storage device, for execution by, or to control the operation of, data processing apparatus, such as a programmable processor, a computer, or multiple computers).

Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

Further, the methods and procedures for carrying out the methods disclosed herein can be performed by one or more programmable processors executing a computer program to perform functions of the invention by operating on input data and generating output. Further, The methods and procedures disclosed herein can also be performed by, and the apparatus disclosed herein can be implemented as, special purpose logic circuitry, such as an FPGA (field programmable gate array) or an ASIC (application specific integrated circuit). Modules and units disclosed herein can also refer to portions of the computer program and/or the processor/special circuitry that implements that functionality.

Referring back to FIG. 3, the digital electronic circuitry 300 can comprise a main memory unit 305 that is connected to a processor 311 and a cache unit 340 configured to store copies of the data from the most frequently used main memory 305.

The processor 311 can be any suitable processor for execution of a computer program. For example, the processor 311 can be a general and/or special purpose microprocessor and/or a processor of a digital computer. The processor can be configured to receive and execute instructions received from the main memory 305.

Further, the processor 311 can comprise a central processing unit (CPU) 315 that includes processing circuitry configured to manipulate instructions received from the main memory 305 and execute various instructions. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor.

Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory 305 can be any suitable form of volatile memory, non-volatile memory, semi-volatile memory, or virtual memory included in machine-readable storage devices suitable for embodying data and computer program instructions. For example, the main memory 305 can comprise magnetic disks (e.g., internal or removable disks), magneto-optical disks, one or more of a semiconductor memory device (e.g., EPROM or EEPROM), flash memory, CD-ROM, and/or DVD-ROM disks.

The main memory 305 can comprise an operating system 320 that is configured to implement various operating system functions. For example, the operating system 320 can be responsible for controlling access to various devices, memory management, and/or implementing various functions of the asset management system disclosed herein. Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers).

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

The processor 311 can further be coupled to a display 370. The display 370 can be configured to display information and instructions received from the processor 311. Further, the display 370 can generally be any suitable display available in the art, for example a Liquid Crystal Display (LCD) or a light emitting diode (LED) display. Furthermore, the display 370 can be a smart and/or touch sensitive display that can receive instructions from a user and forwarded the received information to the processor 311.

The digital circuitry 300 can further comprise an Input/Output (I/O) interface 350 that is configured to connect the processor 311 to various interfaces via an input/output (I/O) device interface 380. The circuitry 300 can further comprise a communications interface 360 that is responsible for providing the circuitry 300 with a connection to a communications network (e.g., communications network 120). Transmission and reception of data and instructions can occur over the communications network 120.

Figure 4:
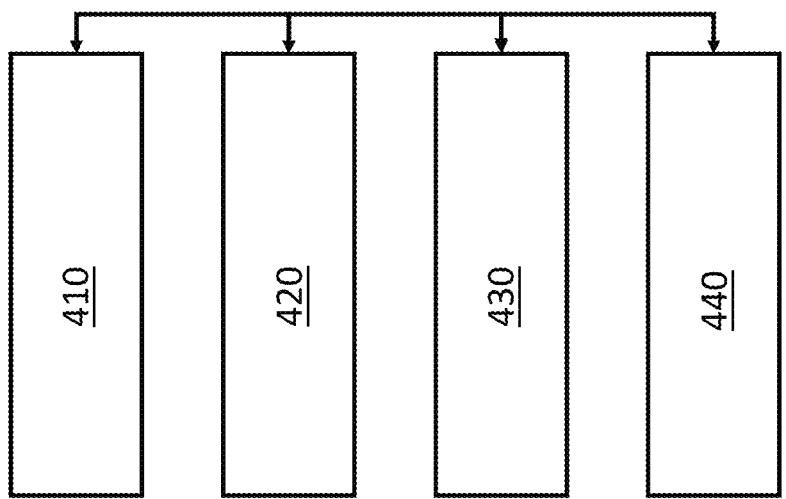
FIG. 4 is a high-level block diagram of example procedures for carrying out content characterization according to some embodiments disclosed herein.

FIG. 4 is a high-level block diagram of example procedures 400 for carrying out content characterization according to embodiments disclosed herein and as illustrated by the systems 100 and 200. As noted above, the application server can initiate the content characterization disclosed herein by receiving content generated by the content sources (step 410). As noted above, the application server can be responsible for performing various functions including aggregating, analyzing, and/or characterizing the received content. The application server can perform various ingestion and enrichment operations on the received data (step 420). The operations can include at least one of speech to text transcriptions on audio and video content (e.g., audio/video content received from subject matter experts), automated machine translations (e.g., upon detection of a non-native language to a native language), video frame detection (e.g., video content received from subject matter experts), transcript summarization and decomposition, and instructions classification. The application server can also perform various other functions on the analyzed content such as at least one of: commonsense task interference analysis, electrodermal emotion weighting, truthfulness analysis and weighting, visual posture analysis and weighting, influence point detection and weighting to extract factors such as context, tone, and emotions of the content (step 430).

The application server can further use the analyzed content to generate graph that characterizes the content received from the content generators (step 440). The graph can include a plurality of nodes and each node can be connected to at least one other node by an edge of the graph. The characterized context is mapped to the nodes such that each node corresponds to a specific step and/or procedure for carrying out a task or process in the received content. The edges can comprise information relating to various actions for carrying out the task or process in the received content.

The generated graph can then be used to characterize the context (step 440). For example, the graph can be used to outline the procedures for carrying out a task described in the received content.

Figure 5:
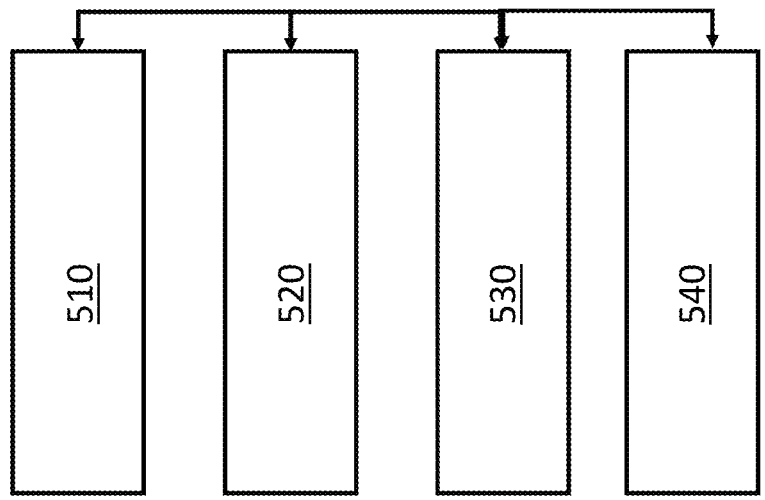
FIG. 5 is another high-level block diagram of example procedures for carrying out content characterization according to some embodiments disclosed herein.

FIG. 5 is another high-level block diagram of example procedures 500 for carrying out content characterization according to some embodiments disclosed herein. As described above, the processor can receive the content generated by the content generators (step 510). Upon receiving the content, the processor can perform one-shot learning to analyze the content and determine the nodes and edges of a graph that represents the context of the content (step 520). Additional factors, such as tone and emotions of the identified context can be used to adjust the tones on the graph (step 530). The adjusted graph nodes can provide a recommendation for at least one action for achieving a desired outcome.

While the invention has been particularly shown and described with reference to specific illustrative embodiments, it should be understood that various changes in form and detail may be made without departing from the spirit and scope of the invention.

What is claimed is:

1. A system for characterizing content relating to a desired outcome, the system comprising:
    at least one memory operable to store content collected from one or more content generators over a predetermined period of time; and
    at least one processor communicatively coupled to the at least one memory, the processor being operable to:
    identify context data included in the collected content;
    map the identified context data into two or more graph nodes and one or more graph edges connecting the at least two graph nodes;
    identify one or more features of the identified context data and adjust at least one of: a graph node and a graph edge based on the identified one or more features;
    identify a graph incorporating the two or more graph nodes, the one or more graph edges, and at least one of an adjusted graph node and an adjusted graph edge; and
    provide a recommendation for at least one action for achieving the desired outcome based on the identified graph,
    wherein the processor is operable to identify the context by performing frame detection on the video content.

2. The system of claim 1, wherein the one of more content generators comprise at least one of audio content and video content obtained from an entity having information on the desired outcome.

3. The system of claim 2, wherein the processor is operable to identify the context based on converting the audio content to text.

4. The system of claim 2, wherein the processor is operable to identify at least one content generator based on one or more characteristics of the at least one content generator.

5. The system of claim 4, wherein the one or more characteristics of the least one content generator comprises at least one of previous content history, previous review of generated content, and known qualifications of the at least one content generator.

6. The system of claim 1, wherein the processor is operable to identify the context by translating the collected content to a native language.

7. The system of claim 1, wherein the processor is configured to identify the one or more features by performing at least one of interference analysis, electrodermal emotions weighting, truthfulness analysis and weighting, visual posture analysis and weighting, and influence point detection and weighting.

8. The system of claim 1, wherein the one or more features comprise at least one of tone and emotion of the identified context.

9. The system of claim 1, wherein the processor is operable to identify the context based on one-shot learning.

10. The system of claim 1, wherein the processor is operable to collect the content from the one or more content generators.

11. The system of claim 10, wherein the processor is operable to collect the content over two or more periods of time.

12. A system for generating a process flow graph from content data, comprising
    one or more content generators for generating the content data, wherein the content data includes one or more of audio data and video data,
    a content collector for collecting the content data generated by the one or more content generators,
    a domain specific knowledge unit for providing domain specific content data,
    a content data pre-processing subsystem having a storage element for storing the content data and a processor for processing the content data and the domain specific content data based on the type of content data to generate processed content data and charactering the processed content data to generate an initial process graph having a plurality of nodes and a plurality of edges, a database for storing the content data from the one or more content generators and the processed content data from the content data pre-processing subsystem, and a processing and weighting subsystem for processing the initial process graph and weighting each of the plurality of nodes relative to each other to generate a final process graph, wherein the content data preprocessing subsystem includes one or more processors for:

converting the audio data to text data, detecting frames in the video data, decomposing the text data into selected components using a natural language processing technique, identifying one or more selected components of the text data and then classifying the text data into at least one of a plurality of classifications using a classification technique, and extracting nodes and edges from the content data and then generating the initial process graph therefrom.

13. The system of claim 12, wherein the selected components of the text data comprise one or more of paragraph, sentences and phrases.

14. The system of claim 12, further comprising a translation unit for translating the text data from one language to another language.

15. The system of claim 12, wherein the processor is operable to identify at least one of the one or more content generators based on one or more characteristics of the one or more content generators.

16. The system of claim 15, wherein the one or more characteristics of the at least one content generator comprises at least one of previous content history data, previous review of generated content data, and known qualifications of the at least one content generator.

17. The system of claim 12, wherein the one or more content generators comprise one or more of an entity, a subject matter expert, and data associated with a biometric wearable device.

18. The system of claim 12, wherein the content data includes audio data, video data, biometric data, physiological data, context data and electronic data.

19. The system of claim 12, wherein the classification technique includes one or more of a recurrent neural network (RNN) technique, bidirectional encoder technique, and long-short term memory (LSTM) technique.

20. The system of claim 12, wherein the domain specific information of the domain knowledge unit includes one or more of domain specific entities, domain specific terms, domain specific actions, and domain specific glossary entries.

21. The system of claim 12, wherein the processing and weighting subsystem includes a video posture analysis subsystem for processing biometric data associated with the content data, wherein the biometric data includes facial expression data of the content generator and posture data of the content generator, and wherein the video posture analysis subsystem comprises a facial analysis unit for analyzing the facial expression data and identifying selected emotions associated with the facial expression data, and a body language analysis unit for analyzing the posture data to identify selected types of body language therein, wherein the facial expression data and the posture data can be used by the processing and weighting subsystem to determine the nodes in the final process graph.

22. The system of claim 21, wherein the processing and weighting subsystem further comprises an emotion detection subsystem for analyzing the content data to identify and determine the emotion data associated with the content data, wherein the content data includes audio data, and wherein the emotion detection subsystem includes an electrodermal tonal information unit for detecting tonal information in the content data associated with one or more of the content generators, and a speech emotion recognition unit for detecting emotion in the audio data.

23. The system of claim 22, wherein the tonal information includes one or more of confidence, calmness, happiness, anger, sadness, fearful, disgust, and surprise associated with the content generator.

24. The system of claim 22, wherein the processing and weighting subsystem further includes a language analysis subsystem for analyzing the audio data portion of the content data, wherein the language analysis subsystem includes a commonsense task inference analysis unit for generating task data from the content data, and a truthfulness analysis and weighting unit for performing feature analysis on the content data.

25. The system of claim 24, wherein the processing and weighting subsystem further comprises a graph edge-node generation unit for generating the final process graph from the initial process graph and then refining the graph nodes and edges of the initial process graph based on the data from one or more of the video posture analysis subsystem, the emotion detection subsystem, and the language analysis subsystem.

26. The system of claim 25, further comprising a multi-factorial context weighting unit for weighting the nodes and edges of the final process graph based on one or more types of addition context data, an influence point detection unit for further weighting the nodes and edges of the final process graph by detecting one or more points of influence in the content data, and a one-shot learning unit for classifying and weighing data associated with the graph nodes.

27. The system of claim 26, wherein the one or more types of additional context data comprises attributes associated with one or more of the content generators.

28. A computer implemented method for generating a process flow graph from content data, comprising providing one or more content generators for generating the content data, wherein the content data includes one or more of audio data and video data, collecting the content data generated by the one or more content generators with a content collector, providing domain specific content data via a domain specific knowledge unit, processing the content data and the domain specific content data with a content data pre-preprocessing subsystem based on the type of content data to generate processed content data and charactering the processed content data to generate an initial process graph having a plurality of nodes and a plurality of edges, storing the content data from the one or more content generators and the processed content data from the content data pre-processing subsystem, and processing the initial process graph and weighting each of the plurality of nodes relative to each other to generate a final process graph with a processing and weighting subsystem, wherein the content data preprocessing subsystem is configured for:

converting the audio data to text data, detecting frames in the video data, decomposing the text data into selected components using a natural language processing technique, identifying one or more selected components of the text data and then classifying the text data into at least one of a plurality of classifications using a classification technique, and extracting nodes and edges from the content data and then generating the initial process graph therefrom.

29. The computer implemented method of claim 28, wherein the selected components of the text data comprise one or more of paragraph, sentences and phrases.

30. The computer implemented method of claim 28, further comprising translating the text data from one language to another language.

31. The computer implemented method of claim 28, further comprising identifying at least one of the one or more content generators based on one or more characteristics of the one or more content generators.

32. The computer implemented method of claim 31, wherein the one or more characteristics of the at least one content generator comprises at least one of previous content history data, previous review of generated content data, and known qualifications of the at least one content generator.

33. The computer implemented method of claim 28, wherein the one or more content generators comprise one or more of an entity, a subject matter expert, and data associated with a biometric wearable device.

34. The computer implemented method of claim 28, wherein the classification technique includes one or more of a recurrent neural network (RNN) technique, bidirectional encoder technique, and long-short term memory (LSTM) technique.

35. The computer implemented method of claim 28, wherein the domain specific information of the domain knowledge unit includes one or more of domain specific entities, domain specific terms, domain specific actions, and domain specific glossary entries.

36. The computer implemented method of claim 28, wherein the processing and weighting subsystem includes a video posture analysis subsystem for processing biometric data associated with the content data, wherein the biometric data includes facial expression data of the content generator and posture data of the content generator, and wherein the video posture analysis subsystem comprises a processor for:

analyzing the facial expression data and identifying selected emotions associated with the facial expression data with a facial analysis unit, and analyzing the posture data to identify selected types of body language therein with a body language analysis unit, wherein the facial expression data and the posture data can be used by the processing and weighting subsystem to determine the nodes in the final process graph.

37. The computer implemented method of claim 36, wherein the processing and weighting subsystem further comprises an emotion detection subsystem for analyzing the content data to identify and determine the emotion data associated with the content data, wherein the content data includes audio data, and wherein the emotion detection subsystem includes a processor for:

detecting tonal information in the content data associated with one or more of the content generators with an electrodermal tonal information unit, and detecting emotion in the audio data with a speech emotion recognition unit.

38. The computer implemented method of claim 37, wherein the tonal information includes one or more of confidence, calmness, happiness, anger, sadness, fearful, disgust, and surprise associated with the content generator.

39. The computer implemented method of claim 37, wherein the processing and weighting subsystem further includes a language analysis subsystem for analyzing the audio data portion of the content data, wherein the language analysis subsystem includes a processor for:

generating task data from the content data with a commonsense task inference analysis unit, and performing feature analysis on the content data with a truthfulness analysis and weighting unit.

40. The computer implemented method of claim 39, wherein the processing and weighting subsystem further comprises a processor for generating the final process graph from the initial process graph and then refining the graph nodes and edges of the initial process graph based on the data from one or more of the video posture analysis subsystem, the emotion detection subsystem, and the language analysis subsystem.

41. The computer implemented method of claim 40, further comprising weighting the nodes and edges of the final process graph based on one or more types of addition context data, further weighting the nodes and edges of the final process graph by detecting one or more points of influence in the content data, and classifying and weighing data associated with the graph nodes.

42. A system for generating a process flow graph from content data, comprising one or more content generators for generating the content data, a content collector for collecting the content data generated by the one or more content generators, a domain specific knowledge unit for providing domain specific content data, a content data pre-processing subsystem having a storage element for storing the content data and a processor for processing the content data and the domain specific content data based on the type of content data to generate processed content data and characterizing the processed content data to generate an initial process graph having a plurality of nodes and a plurality of edges, a database for storing the content data from the one or more content generators and the processed content data from the content data pre-processing subsystem, and a processing and weighting subsystem for processing the initial process graph and weighting each of the plurality of nodes relative to each other to generate a final process graph, wherein the processing and weighting subsystem includes a video posture analysis subsystem for processing biometric data associated with the content data, wherein the biometric data includes facial expression data of the content generator and posture data of the content generator, and wherein the video posture analysis subsystem comprises a facial analysis unit for analyzing the facial expression data and identifying selected emotions associated with the facial expression data, and a body language analysis unit for analyzing the posture data to identify selected types of body language therein, wherein the facial expression data and the posture data can be used by the processing and weighting subsystem to determine the nodes in the final process graph.

43. A computer implemented method for generating a process flow graph from content data, comprising providing one or more content generators for generating the content data, collecting the content data generated by the one or more content generators with a content collector, providing domain specific content data via a domain specific knowledge unit, processing the content data and the domain specific content data with a content data pre-preprocessing subsystem based on the type of content data to generate processed content data and charactering the processed content data to generate an initial process graph having a plurality of nodes and a plurality of edges, storing the content data from the one or more content generators and the processed content data from the content data pre-processing subsystem, and processing the initial process graph and weighting each of the plurality of nodes relative to each other to generate a final process graph with a processing and weighting subsystem, wherein the processing and weighting subsystem includes a video posture analysis subsystem for processing biometric data associated with the content data, wherein the biometric data includes facial expression data of the content generator and posture data of the content generator, and wherein the video posture analysis subsystem comprises a processor for:

analyzing the facial expression data and identifying selected emotions associated with the facial expression data with a facial analysis unit, and analyzing the posture data to identify selected types of body language therein with a body language analysis unit, wherein the facial expression data and the posture data can be used by the processing and weighting subsystem to determine the nodes in the final process graph.

\* \* \* \* \*